United States Patent
Sam

(10) Patent No.: US 7,416,205 B1
(45) Date of Patent: Aug. 26, 2008

(54) HITCH MIRROR ASSEMBLY

(76) Inventor: Ernesto Roger Sam, 14910 SW. 155 Ter., Miami, FL (US) 33187

( * ) Notice: Subject to any disclaimer, the term of this patent is extended or adjusted under 35 U.S.C. 154(b) by 161 days.

(21) Appl. No.: 11/533,006

(22) Filed: Sep. 19, 2006

(51) Int. Cl.
*B60D 1/66* (2006.01)
(52) U.S. Cl. .................. 280/477; 359/850; 359/844; 359/857
(58) Field of Classification Search ............ 280/477, 280/177; 359/478, 844, 850
See application file for complete search history.

(56) References Cited

U.S. PATENT DOCUMENTS

| | | | | |
|---|---|---|---|---|
| 5,886,839 | A * | 3/1999 | Arnone et al. | 359/857 |
| 6,499,851 | B1 * | 12/2002 | Kelly et al. | 359/850 |
| 6,769,709 | B1 * | 8/2004 | Piper et al. | 280/477 |
| 2004/0136062 | A1 * | 7/2004 | Farkash | 359/402 |
| 2006/0082871 | A1 * | 4/2006 | Bolland | 359/402 |
| 2007/0241535 | A1 * | 10/2007 | Salyers | 280/477 |

* cited by examiner

*Primary Examiner*—J. Allen Shriver
*Assistant Examiner*—Tashiana Adams
(74) *Attorney, Agent, or Firm*—Albert Bordas, P.A.

(57) ABSTRACT

A hitch mirror assembly removably mounted onto a top edge of a vehicle's tailgate, comprising a housing assembly, a mirror assembly within the housing assembly, battery-powered illumination means and a clamp assembly. The vehicle has a hitch ball for towing a trailer that has a hitch ball coupler. When the hitch mirror assembly is mounted, a person is able to view the hitch ball from inside the vehicle's cab with the mirror assembly, while backing up the vehicle to align the hitch ball underneath the hitch ball coupler. The illumination means illuminate the hitch ball if required and reflective strips mounted to the hitch ball coupler reflect the light projecting from the illumination means to make the hitch ball coupler more visible from the driver's position. The clamp assembly removable secures the housing assembly to the vehicle's tailgate and includes an elongated member, a telescopic housing and a clamp member.

14 Claims, 4 Drawing Sheets

HITCH MIRROR ASSEMBLY

BACKGROUND OF THE INVENTION

1. Field of the Invention

The present invention relates to a hitch mirror assembly, and more particularly, to a hitch mirror assembly that is removably mounted onto a top edge of a vehicle tailgate to allow a driver to view the vehicle's hitch ball from within the vehicle cab and via a mirror assembly, while reversing the vehicle, to align the hitch ball underneath trailer's hitch ball coupler.

2. Description of the Related Art

Before towing a trailer with a vehicle, such as a pick-up truck, it is often necessary for a driver to couple the vehicle's hitch ball to the trailer's hitch ball coupler. When attempting to perform this task, drivers do not have the ability to see when the hitch ball is aligning with the trailer's hitch ball coupler. Often, a driver has to approach the trailer with the vehicle and then exit the vehicle, walk to the rear of the vehicle to see if the hitch ball is aligned with the trailer's hitch ball coupler. This process may be repeated several times until the driver successfully aligns the hitch ball with the trailer's hitch ball coupler and finally couples it.

Several hitch mirror assemblies have been developed in the past to help drivers perform this task. None of them, however, enable the driver to mount the instant invention onto the top edge of a vehicle tailgate and align it, wherein the driver can view the vehicle's hitch ball through a first window standing outside the vehicle and then the driver can view the vehicle's hitch ball through a second window from within the vehicle cab. Additionally, the present invention has illumination means for use in poor visibility or during nighttime use.

Applicant believes that one of the closest reference corresponds to U.S. Patent Application Publication No. 2006/0016954, published on Jan. 26, 2006 to Richard Dale Saxwold for a visual aid for aligning a towing vehicle and a trailer hitch. However, it differs from the present invention because Saxwold teaches methods and an apparatus for assisting an operator maneuvering a towing vehicle backward to align a first trailer hitch component on the rear of the towing vehicle and on the forward portion of a trailer by directing a field of view comprising an image of the trailer hitch components to the line of sight of an observer sitting in the driver's seat of the towing vehicle. Visual aid devices include a mirror, a magnet for removably attaching the visual aid device to a selectable location on either the towing vehicle or the trailer, and a support for adjustably affixing the mirror to the magnet. The mirror is movably positionable, in relationship to the magnet, within a fixed range of position options and the angle of the mirror axis in relationship to the magnet axis is adjustable within a fixed range of angle options.

Applicant believes that another reference corresponds to U.S. Patent Application Publication No. 2005/0012017, published on Jan. 20, 2005 to Robert J. Ward for a trailer alignment aid with universal mounting device. However, it differs from the present invention because Ward teaches systems and methods for trailer alignment including a clamping mechanism configured to rigidly and removably clamp to a neck of a trailer hitch ball. An arm arrangement is rotatably attached to the clamping mechanism. The arm arrangement is configured to extend from the clamp arrangement to beyond an edge of a tow vehicle. A mirror may be attached to the arm arrangement and configured to provide a view of the trailer hitch ball from the inside of the tow vehicle. A sight rod may be attached to the clamping device and configured to bend in response to a trailer coupler approaching the trailer hitch ball at a predetermined distance from a selectable angle.

Applicant believes that another reference corresponds to U.S. Pat. No. 6,357,126 issued to Gillen, Jr. on Mar. 19, 2002 for a trailer hitch alignment device. However, it differs from the present invention because Gillen, Jr. teaches a device for aligning a trailer hitch ball with a trailer coupling that includes an elongated guide strip that is positioned on the ground with a portion immediately beneath the ball on the towing vehicle and a second portion immediately beneath the trailer coupling. A first target is mounted on the trailer hitch ball while a second target is mounted on the trailer coupling. A convex mirror assembly is mounted on the rear of the towing vehicle using any one of a plurality of adjustable mounting brackets. The mirror is positioned such that the towing vehicle driver can see the trailer hitch ball and the target mounted thereon. The towing vehicle driver reverses the vehicle while guiding the first target along the alignment strip. When the driver observes that the first and second targets are aligned, the coupling is properly aligned with the trailer hitch ball.

Other patents describing the closest subject matter provide for a number of more or less complicated features that fail to solve the problem in an efficient and economical way. None of these patents suggest the novel features of the present invention including a hitch mirror assembly comprising a housing assembly with a mirror assembly mounted therein, illumination means and a clamp assembly as the present invention does.

SUMMARY OF THE INVENTION

A hitch mirror assembly used in combination with a vehicle having a hitch ball and a trailer having a hitch ball coupler, comprising a housing assembly having first, second and third windows. A mirror assembly is mounted within the housing assembly and has first and second mirrors disposed at a predetermined angle with respect to each other. The first mirror angularly faces the first and second windows, enabling an image to be viewed when looking through the first window to the first mirror and through the second window. The second mirror angularly faces the second and third windows, enabling the same image to be viewed when looking through the third window to the second mirror and through the second window. A clamp assembly is secured to the housing assembly. The clamp assembly is removably mounted onto a tailgate of a vehicle.

The first and third windows are vertically disposed and face in opposite directions with respect to each other. The first and third windows are perpendicularly disposed with respect to the second window. The housing assembly has a substantially inverted L-shape design. The instant invention may also comprise illumination means to illuminate the image. The illumination means comprises energy means to power the illumination means. The illumination means comprises at least one illuminating bulb or diode that is mounted onto the housing assembly. The energy means comprises at least one battery. The illumination means further comprises reflective strips secured onto a hitch ball coupler of a trailer.

The housing assembly also comprises a battery housing to house the at least one battery and a telescopic housing. The clamp assembly comprises an elongated member that telescopically extends from the telescopic housing. The instant invention also comprises aligning means, wherein a person viewing through the third window may position the housing assembly to a desired location until the image is seen as the elongated member telescopically extends from the telescopic housing. The image is a hitch ball of the vehicle. Upon completion of the aligning means, the person may view the hitch ball through the first window from inside the vehicle and operate a steering wheel of the vehicle to steer the hitch ball to the hitch ball coupler.

The elongated member may comprise a fixed jaw at a distal end and an adjusting jaw positioned in between the fixed jaw and the telescopic housing. The fixed jaw and the adjusting jaw mount onto a tailgate of the vehicle.

It is therefore one of the main objects of the present invention to provide a hitch mirror assembly that is removably mounted onto a top edge of a vehicle's tailgate.

It is another object of this invention to provide a hitch mirror assembly comprising a housing assembly, a mirror assembly housed within the housing assembly, and battery powered illumination means for use during poor visibility or during nighttime use.

It is another object of the present invention to provide a hitch mirror assembly that allows the driver to view the hitch ball from inside the vehicle's cab, while backing up the vehicle, to align a hitch ball underneath a hitch ball coupler.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
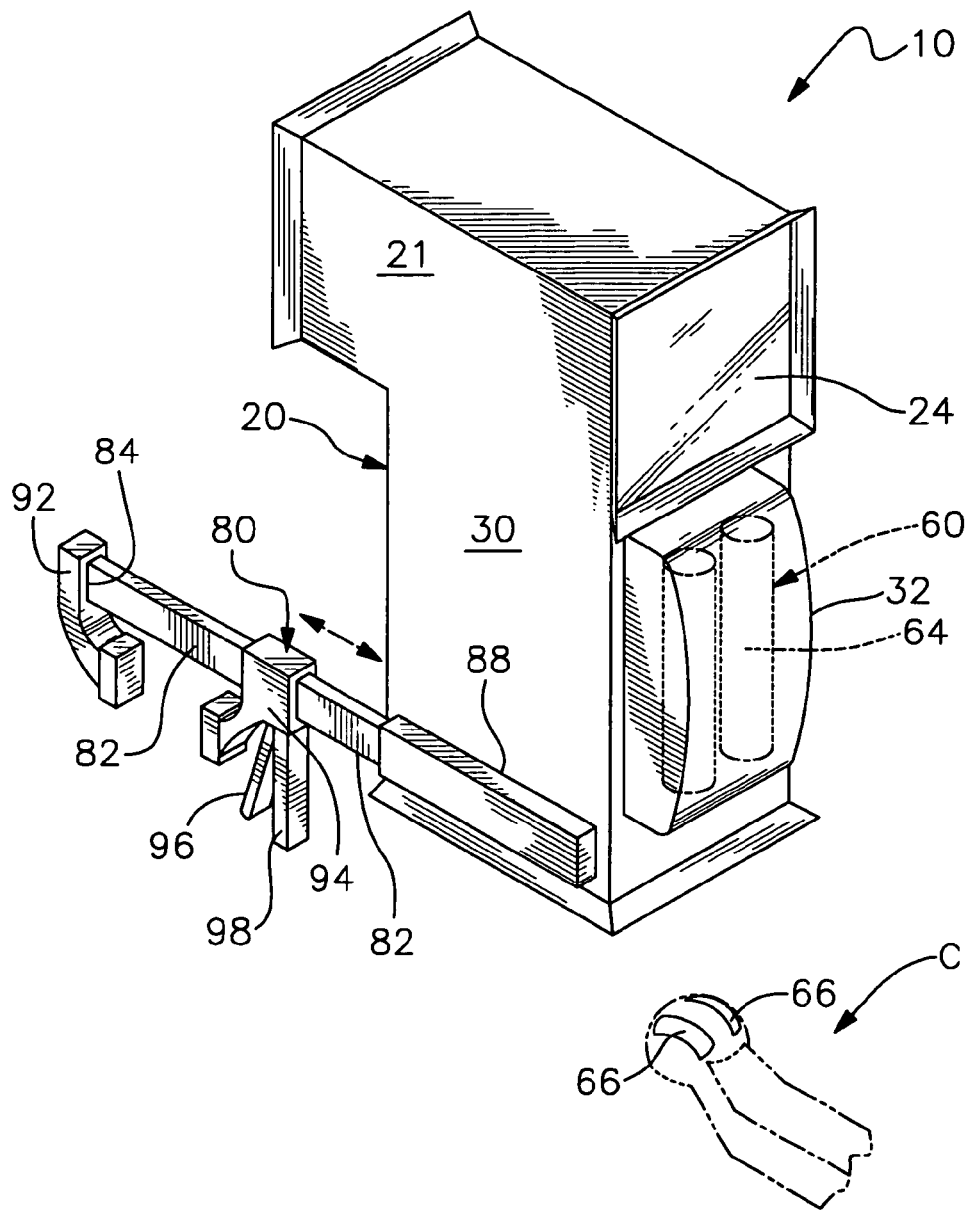
FIG. 1 represents an isometric view of the hitch mirror assembly plus reflective strips adhered onto a trailer's hitch ball coupler, object of the present invention.

Referring now to the drawings, the hitch mirror assembly of the present invention is generally referred to with numeral 10. It can be observed that it basically includes housing assembly 20 having mirror assembly 40 within, illumination means 60, and clamp assembly 80.

Figure 2:
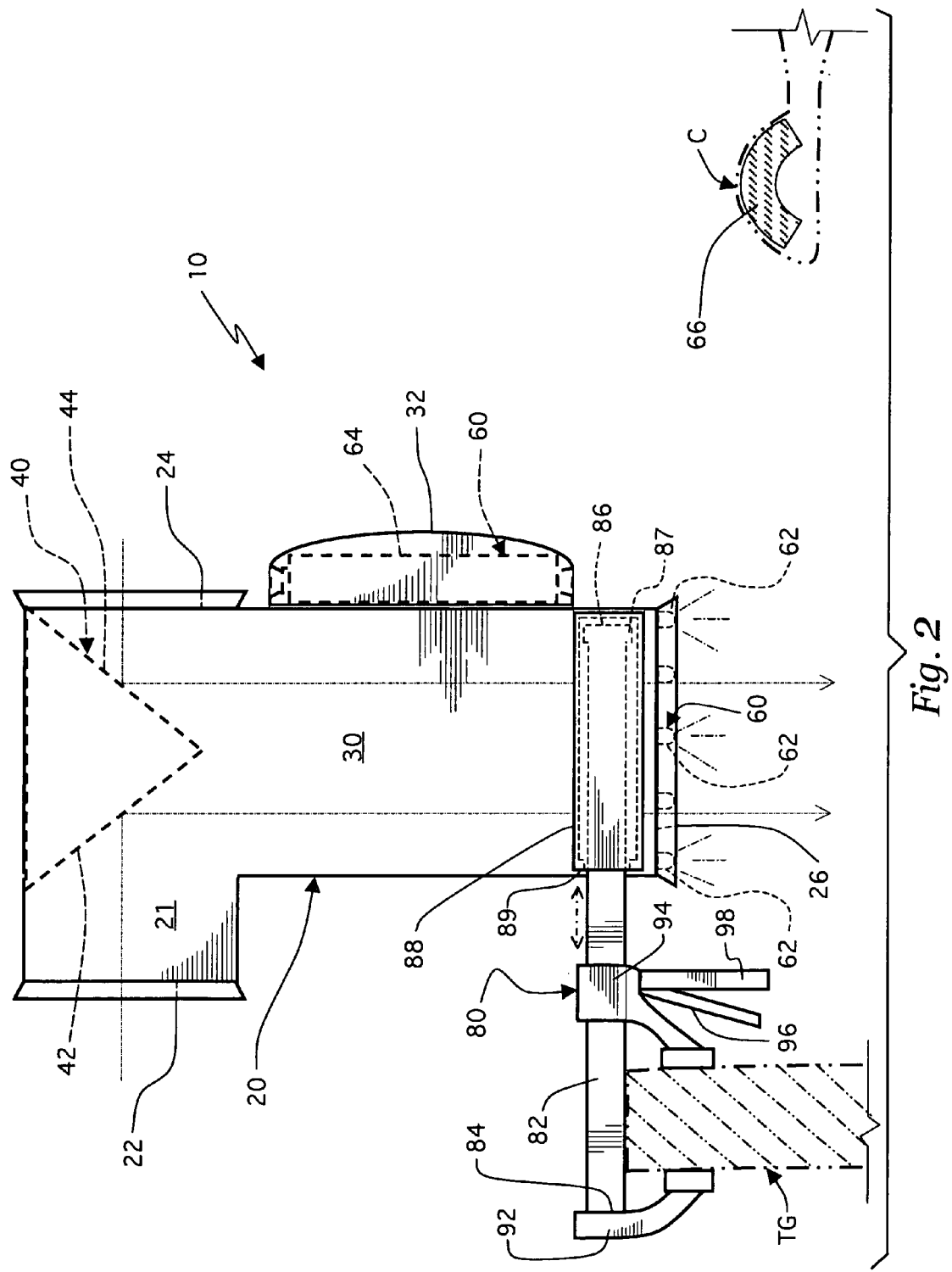
FIG. 2 is a side elevational view of the hitch mirror assembly shown in FIG. 1 plus the reflective strips adhered onto a trailer's hitch ball coupler.

As seen in FIGS. 1 and 2, housing assembly 20 has a substantially inverted L-shape design with windows 22, 24 and 26, horizontal member 21 and vertical member 30. Mounted onto a first face of vertical member 30 is battery housing 32. Battery housing 32 houses at least one battery 64. At least one battery 64 provides energy means to power illumination means 60, and specifically light bulbs 62 when a switch is activated, not seen. It is noted that battery 64 can be, but is not limited to the type: alkaline, rechargeable alkaline, nickel-metal hydride (NiMH), nickel-cadmium, (NiCad), lithium, carbon zinc, or zinc chloride. Illumination means 60 may also use light-emitting diodes (LEDs), or bulbs having similar characteristics, instead of light bulbs 62.

A plurality of light bulbs 62 is mounted to the bottom of housing assembly 20 and around window 26. Light bulbs 62 project light downwardly towards hitch ball HB, seen in FIG. 3, and illuminate hitch ball HB if required during poor visibility of during nighttime use. In the preferred embodiment, illumination means 60 further comprises reflective strips 66. Reflective strips 66 may consist of a single strip or multiple strips that have adhesive properties on the side that is not reflective. The adhesive property allows reflective strips 66 to adhere to a top/convex portion of hitch ball coupler C, such as the one illustrated in each of the figures. As described above, light bulbs 62 project light downwardly towards hitch ball HB and reflect off of reflective strips 66 as housing assembly 20 is aligned over the reflective strips 66. Reflective strips 66 reflect light emitted by light bulbs 62 to make hitch ball coupler C more visible from the driver's position in the vehicle's cab through housing assembly 20, thus providing a greater visual notice of the alignment of housing assembly 20 over reflective strips 66.

Mounted onto a second face of vertical member 30 is telescopic housing 88. Extending from telescopic housing 88 is elongated member 82 of clamp assembly 80. Elongated member 82 terminates at end 84. End 84 has fixed jaw 92 mounted thereon. Between end 84 and telescopic housing 88 is adjusting jaw 94 that has handle 98 and adjusting lever 96. Internal components, not seen, allow adjusting jaw 94 to slidably journal elongated member 82 when adjusting lever 96 is forced in the direction of handle 98, and allows adjusting jaw 94 to lock to a stationary position on elongated member 82 when adjusting lever 96 is released.

As seen in FIG. 2, elongated member 82 further comprises end 86 having stopper 87. Telescopic housing 88 telescopically receives elongated member 82. Stopper 87 limits the movement of telescopic housing 88 along elongated member 82 when it meets stopper 89 of telescopic housing 88.

Housing assembly 20 houses mirror assembly 40. Mirror assembly 40 comprises mirrors 42 and 44. In the preferred embodiment, mirrors 42 and 44 internally extend from a ceiling face of housing assembly 20 and are disposed at predetermined angles with respect to windows 22, 24 and 26. The predetermined angle of mirror 42 with respect to windows 22 and 26 should be such that a projection line defined by the driver's sight through window 22 is reflected through vertical member 30 and through window 26 onto hitch ball HB. Similarly, the predetermined angle of mirror 44 with respect to windows 24 and 26 should be such that a projection line defined by the driver's sight through window 24 is similarly reflected through vertical member 30 and through window 26 onto hitch ball HB. In the preferred embodiment, mirrors 42 and 44 are disposed at approximately a 90-degree angle with respect to each other.

Figure 3:
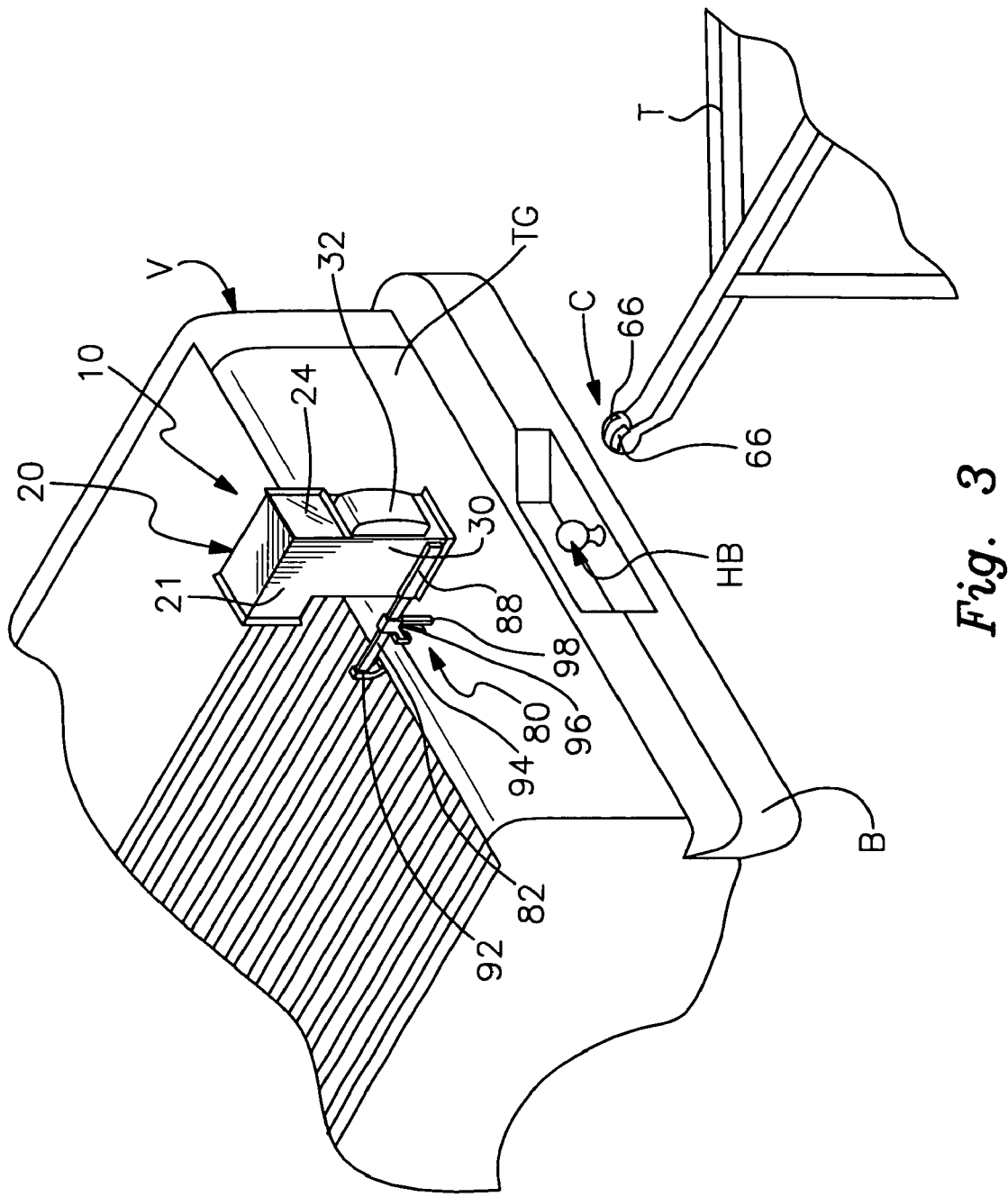
FIG. 3 shows an isometric view of the present invention, mounted onto a top edge of a vehicle's tailgate and being used to align the vehicle's hitch ball with the trailer's hitch ball coupler.

As seen in FIG. 3, clamp assembly 80 is secured onto vehicle V, and more specifically a top edge of the vehicle's tailgate TG. Vehicle V has a hitch ball HB mounted to bumper B for towing a trailer T. Trailer T has a hitch ball coupler C to receive hitch ball HB. In an alternate embodiment, a hitch ball assembly may also comprise an elongated member that terminates as a hitch ball HB, generally extending outwardly from bumper B a predetermined distance. To mount clamp assembly 80 onto tailgate TG, window 22 is oriented toward the direction of the vehicle V driver's position and adjusting jaw 94 is slidably journaled along elongated member 82 and once tailgate TG is tightly fitted in between adjusting jaw 94 and fixed jaw 92, adjusting lever 96 is released to lock adjusting jaw 94 in place. In an alternate embodiment, the distal ends of fixed jaw 92 and adjusting jaw 94 may comprise suction cups to secure to tailgate TG. In a second alternate embodiment, elongated member 82 may have a large suction cup instead of fixed jaw 92 that may mount onto a lateral wall of tailgate TG.

Once clamp assembly 80 is secured onto tailgate TG, housing assembly 20 must be aligned. As alignment means, the driver, or other capable person, stands behind vehicle V and grasps housing assembly 20. While looking through window 24, the driver positions housing assembly 20, as telescopic housing 88 telescopically receives elongated member 82, until the projection line defined by the driver's sight through window 24 is reflected through vertical member 30 and through window 26 onto hitch ball HB. At this point, instant invention 10 is aligned, meaning that the projection line defined by the driver's sight through window 22 is also reflected through vertical member 30 and through window 26 onto hitch ball HB.

Figure 4:
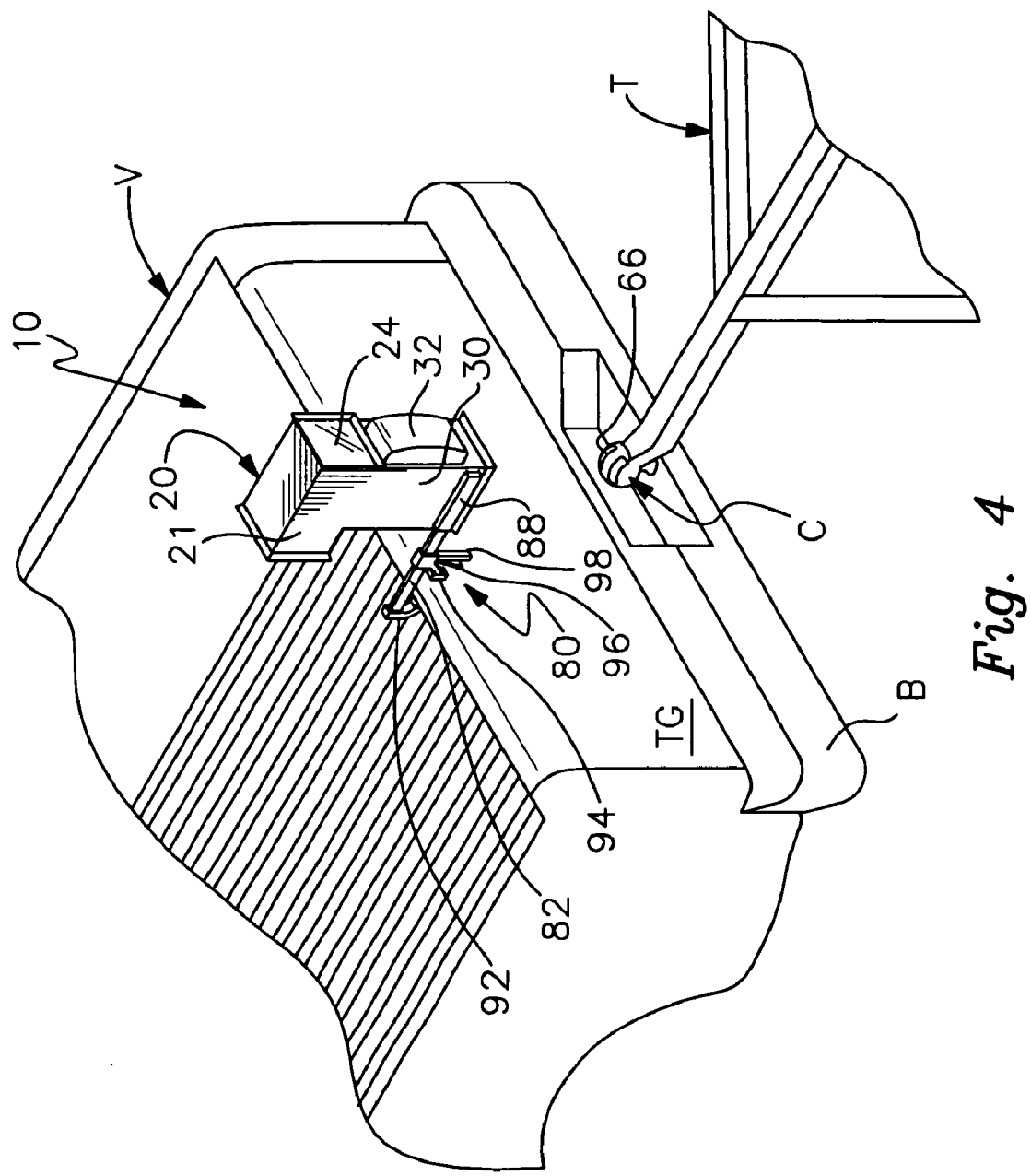
FIG. 4 illustrates an isometric view of the present invention, as shown in FIG. 3, when the trailer's hitch ball coupler has been aligned and mounted onto the vehicle's hitch ball.

When hitch mirror assembly 10 is mounted to tailgate TG and aligned, the driver is able to view hitch ball HB from inside the vehicle's cab through mirror assembly 40, while efficiently and effectively backing up vehicle V to align hitch ball HB underneath hitch ball coupler C, as seen in FIG. 4.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A hitch mirror assembly used in combination with a vehicle having a hitch ball and a trailer having a hitch ball coupler, comprising:
    A) a housing assembly having first, second and third windows;
    B) a mirror assembly mounted within said housing assembly and having first and second mirrors disposed at a predetermined angle with respect to each other, said first mirror angularly facing said first and second windows enabling an image to be viewed when looking through said first window to said first mirror and through said second window, and said second mirror angularly facing said second and third windows, enabling said image to be viewed when looking through said third window to said second mirror and through said second window; and
    C) a clamp assembly secured to said housing assembly, said clamp assembly removably mounted onto a tailgate of a vehicle.

2. The hitch mirror assembly used in combination with a vehicle having a hitch ball and a trailer having a hitch ball coupler set forth in claim 1, further characterized in that said first and third windows are vertically disposed and face in opposite directions with respect to each other, and said first and third windows are perpendicularly disposed with respect to said second window.

3. The hitch mirror assembly used in combination with a vehicle having a hitch ball and a trailer having a hitch ball coupler set forth in claim 1, further characterized in that said housing assembly has a substantially inverted L-shape design.

4. The hitch mirror assembly used in combination with a vehicle having a hitch ball and a trailer having a hitch ball coupler set forth in claim 1, further comprising illumination means to illuminate said image.

5. The hitch mirror assembly used in combination with a vehicle having a hitch ball and a trailer having a hitch ball coupler set forth in claim 4, further characterized in that said illumination means comprises energy means to power said illumination means, said illumination means comprises at least one illuminating bulb or diode mounted onto said housing assembly.

6. The hitch mirror assembly used in combination with a vehicle having a hitch ball and a trailer having a hitch ball coupler set forth in claim 5, further characterized in that said energy means comprises at least one battery.

7. The hitch mirror assembly used in combination with a vehicle having a hitch ball and a trailer having a hitch ball coupler set forth in claim 5, further characterized in that said illumination means further comprises reflective strips secured onto a hitch ball coupler of a trailer.

8. The hitch mirror assembly used in combination with a vehicle having a hitch ball and a trailer having a hitch ball coupler set forth in claim 6, further characterized in that said housing assembly comprises a battery housing to house said at least one battery.

9. The hitch mirror assembly used in combination with a vehicle having a hitch ball and a trailer having a hitch ball coupler set forth in claim 1, further characterized in that said housing assembly comprises a telescopic housing.

10. The hitch mirror assembly used in combination with a vehicle having a hitch ball and a trailer having a hitch ball coupler set forth in claim 9, further characterized in that said clamp assembly comprises an elongated member that telescopically extends from said telescopic housing.

11. The hitch mirror assembly used in combination with a vehicle having a hitch ball and a trailer having a hitch ball coupler set forth in claim 10, further comprising aligning means, wherein a person viewing through said third window may position said housing assembly to a desired location until said image is seen as said elongated member telescopically extends from said telescopic housing, and said image is a hitch ball of said vehicle.

12. The hitch mirror assembly used in combination with a vehicle having a hitch ball and a trailer having a hitch ball coupler set forth in claim 11, further characterized in that upon completion of said aligning means, said person may view said hitch ball through said first window from inside said vehicle and operate a steering wheel of said vehicle to steer said hitch ball to said hitch ball coupler.

13. The hitch mirror assembly used in combination with a vehicle having a hitch ball and a trailer having a hitch ball coupler set forth in claim 10, further characterized in that said elongated member comprises a fixed jaw at a distal end and an adjusting jaw positioned in between said fixed jaw and said telescopic housing.

14. The hitch mirror assembly used in combination with a vehicle having a hitch ball and a trailer having a hitch ball coupler set forth in claim 13, further characterized in that said fixed jaw and said adjusting jaw mount onto a tailgate of said vehicle.

* * * * *